US006309750B1

(12) United States Patent
Revill

(10) Patent No.: US 6,309,750 B1
(45) Date of Patent: Oct. 30, 2001

(54) ADHERENT PLASTIC NOTE

(75) Inventor: Morten Revill, Oslo (NO)

(73) Assignee: Supernotes AS, Oslo (NO)

( * ) Notice: Subject to any disclaimer, the term of this patent is extended or adjusted under 35 U.S.C. 154(b) by 0 days.

(21) Appl. No.: 09/425,411

(22) Filed: Oct. 25, 1999

(51) Int. Cl.[7] .................................................. B32B 9/00

(52) U.S. Cl. ......................... 428/409; 428/219; 428/343; 428/195

(58) Field of Search .................................... 428/195, 207, 428/219, 327, 341, 343, 500, 409; 283/74, 81

(56) References Cited

U.S. PATENT DOCUMENTS 4,885,352 * 12/1989 Erickson ........................... 526/348.1
5,186,499 2/1993 Mason .
5,776,604 * 7/1998 Lu et al. .............................. 428/343

FOREIGN PATENT DOCUMENTS 197 44 609 A1 4/1999 (DE) .

OTHER PUBLICATIONS

International Search Report, Mar. 15, 2001, International Application No. PCT/IB00/01723.

* cited by examiner

*Primary Examiner*—Bruce H. Hess
*Assistant Examiner*—B. Shewareged
(74) *Attorney, Agent, or Firm*—Niro, Scavone, Haller & Niro

(57) ABSTRACT

Adherent plastic notes, using static charged or conventional adhesive materials as the adherent mechanism, are provided which are more durable and smear-proof than conventional paper notes such as “post-its”. Holders and/or dispensers are also provided for convenient use of the plastic notes.

14 Claims, 1 Drawing Sheet

ADHERENT PLASTIC NOTE

BACKGROUND OF THE INVENTION

The invention generally relates to adherent notes such as those commonly known as "post-its". More specifically, the invention concerns adherent plastic notes employing a treated, coated plastic film.

U.S. Ser. No. 09/065,918, titled "Coated Plastic Receipt" and filed Apr. 24, 1998, is hereby incorporated by reference in its entirety.

The use of adhesive paper notes such as "post-its" has become widespread in recent years. These notes employ adhesive glue which allows them to adhere to a variety of surfaces such as PC screens, telephones, walls, mirrors, windows, whiteboards, books, etc. While such adhesive notes are widely used, there are nonetheless problems encountered in their use. One problem is that the adhesive may lose its effect over time, allowing the notes to fall or minimizing their reusability.

This may occur, for example, due to temperature changes or contact with moisture, restricting the notes'use. Outdoor use of such adhesive notes can be very limited.

Another issue is the considerable manufacturing cost associated with the adhesive component of such notes. Also, since all versions of such notes contain some type of adhesive glue, product differentiation is limited to the marketing of relatively minor design and aesthetic differences between notes provided by the different suppliers.

It is, therefore, an object of the present invention to provide improved notes which are adherent to a wide range of surfaces, but which do not require an adhesive glue, so that they are more cost-efficient to manufacture.

It is another object to provide a re-usable note with a lengthened life cycle.

It is another object to provide a more durable note which is readily useable outdoors and/or in moist or wet conditions.

It is another object of the present invention to provide an adherent note which may provided in several different forms, such as being transparent, translucent, or in a range of colors, both for improved usability and so that it may be more easily differentiated from existing adhesive notes.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Plastic" means any of numerous organic synthetic or processed materials that are mostly thermoplastic or thermosetting polymers of high molecular weight and that can be molded, cast, extruded, drawn or laminated into a film, including blends of plastic with other materials or additives consistent with and suitable for use with the adherent notes of the present invention.

"Relatively smear-proof" refers to printed indicia applied to the surface of a note which are sufficiently smudge-proof and smear-proof so as to not substantially impair the consumer's ability to use and read the printed indicia on the note.

"Adherence mechanism" means any feature, medium, technique or material which may be used to cause the plastic note of the present invention to adhere to a surface, including static electricity, adhesive glue, or other mechanisms.

"Printed indicia" means information provided in at least handwritten, printed or colored form, such as by using writing instruments like pens, pencils, highlighters or markers.

SUMMARY OF THE INVENTION

The objects mentioned above, as well as other objects, are solved by the present invention, which overcomes disadvantages of prior art adhesive paper notes, while providing new advantages not previously obtainable with such adhesive notes.

In one preferred embodiment, an adherent plastic note capable of accepting printed indicia is provided. The adherent plastic note includes at least one layer of a plastic film treated on at least one side of the plastic film so as to tension a surface of the film. An absorbent coating capable of receiving relatively smear-proof printed indicia is then applied to the at least one treated side of the at least one layer of the plastic film. The plastic note is also provided with an adherence mechanism, such as static electricity or adhesives such as adhesive glue, that renders the note capable of being adhered to various surfaces.

In a particularly preferred embodiment, the film/film coefficient of friction (CF) level of the plastic note is between about 0.4 and 0.7; the coating is applied to the treated side of the at least one layer of the plastic film within a range of about 2–4 $g/m^2$; and the treatment level for the plastic film surface is about equal to or greater than 38 dyne/cm.

The coating may either be solvent-based or water-based. If solvent-based, a nitrocellulose bonding system may be used. If water-based, a suitable acrylic binder may be used.

The plastic film may be transparent. The film or the coated may also be colored using white and/or color pigments.

A method for manufacturing the adherent plastic notes of the present invention also forms part of the present invention. In a preferred embodiment of this method, at least one layer of a plastic film is provided, and at least one side of the film is treated so as to tension a surface of the film. An absorbent coating is applied to the at least one treated side of the at least one layer of the plastic film, so that relatively smear-proof printed indicia may be applied to the coating. An adherence mechanism, such as charging the plastic note with static electricity or applying an adhesive such as adhesive glue, may now be imparted or provided to the plastic note which renders the note capable of being adhered to various surfaces.

In another preferred method embodiment of the present invention, both sides of the plastic film may be treated to tension both opposing film surfaces, and then one treated side may then be coated with an absorbent coating permitting the application of relatively smear-proof printed indicia. Information such as advertising information may be provided to the treated, uncoated film side.

In yet another embodiment of the present invention, a device is provided for holding and dispensing the adherent plastic notes. A holder, such as a flat pad which may have metal and rubber sections or layers, may be used to support a notepad of the plastic notes, for example. A mechanism such as a metal weight, weighted roller, or a spring-loaded part, may be used to retain the notes in an initial position, and to create resistance when removing the notes from the holder so as to induce a static charge in the note. The notes may be repeatedly used by re-charging them.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
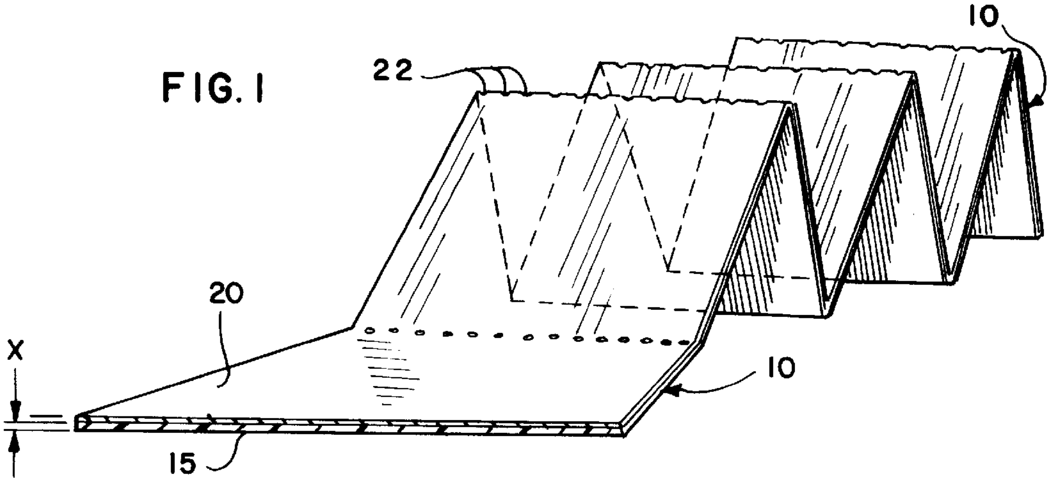
FIG. 1 is a perspective view of a stream of adherent notes separated by perforated connections which may be piled and stacked, and held together by the static on the coated film.

In a preferred embodiment of the present invention, plastic film adhesive notes are provided, which may or may not be bound or otherwise attached in notepad or other forms. Referring to FIG. 1, each note includes at least one layer of a plastic film 15. The plastic film is manufactured and treated so that it is readily static-charged and subsequently coated as described below, and then charged so that it becomes adherent to any given surface through static electricity.

At least one side of the plastic film (such as the front of the note, to receive written/printed indicia) is treated, e.g., by corona or flame treating as is well known in the art, so that the film surface is suitably tensioned such that a coating may be applied. The treated plastic film is then coated with an absorbent coating 20 capable of rapidly absorbing printed indicia such as handwriting ink or pencil. Coating 20 may be a solvent-based coating upon which ballpoint, roller, byro pen or pencil can be written. Preferably, however, the coating is a water-based coating, since a water-based coating may be recycled more easily. If a water-based coating is used, some of the raw materials of glue may be employed, to give the front of the note (i.e., the portion to which printed indicia is applied) a slight adhesive quality, enhancing the note's ability to stick together in the form of a notepad. It may also be necessary to re-charge the note with static electricity after completing the coating operation, or just before or during packaging. This may be done, for example, by running the film over a metal roller or other object which induces static in the coated film.

Plastic film 15 preferably has a negligible absorption factor compared to coating 20 (delta value 20). In other words, coating 20 preferably has an absorption factor of at least about 20 times that of the film. It has been found that absorption differentials of this magnitude permit ink transmitted from a writing or printing instrument to be immediately absorbed and dried so that the inked indicia on the plastic note quickly dries in a relatively smudge-free and smear-proof free manner. While an absorption factor of 20 is the absorption differential for the preferred embodiment, in practice, an absorption factor of at least about delta value 10 is required (i.e., the coating should have an absorption factor of at least about 10 times that of the film) and intermediate delta values between 10 and 20 may be preferred for a given application. When a sufficiently high delta value is used (e.g., 20), should plastic note 10 of the present invention be placed in a moist or wet environment, the printed indicia will not smear or be erased.

If a solvent-based coating is used, coating 20 may consist of China clay or similar products having a nitrocellulose bonding system. The coating may also consist of an alcohol-based coating made from substances from the following group: nitrocellulose, ethanol, N-propanol, ethylacetate N propylacetate or synthetic resin. A suitable coating 20 originally developed for use with plastic cash register receipts is absorption coating No. 19852 manufactured by Coates Lorrilleaux Group of Paris, France (through its Oslo, Norway office). The friction coefficient of the No. 19852 coating is about 0.60–0.64, as measured by the Davenport method.

Coating 20 may also be applied to both upper and lower surfaces of note 10, if for some reason it is desired to apply printed indicia to both plastic film surfaces.

It may be desirable to place advertising information, such as the manufacturer's logo or other information, on the plastic note. In this event, advertising information may be placed on the treated surface of the note, and this surface or surface portion need not be coated for this purpose. However, if printed indicia is to be applied (such as handwritten pencil or ink) to a surface, that surface should be both chemically treated/tensioned, and coated.

One difference between water-based and solvent-based coatings used with the present invention is that the former need not use a nitrocellulose bonding system. Instead, a water-based coating used with the present invention may employ an acrylic binder bonding system suited to receive and absorb printed indicia. The specific acrylic binder selected will be apparent to those of ordinary skill in the art, and should create a tension on the note's surface which is sufficiently absorbing and suitable for receiving printed indicia such as handwriting in pencil or ink (as opposed to a different surface tension created by different acrylic binders suitable for, e.g., receiving lithographic print).

Absorbent coating 20 may also contain a coloring pigment. The pigment is preferably white, but other color pigments may be used instead of or in combination with a white pigment. The pigments are preferably used to provide notes that are high in opacity, and not significantly translucent. If a transparent film is used, coating of the film may result in a film with any one of a range of colors, e.g., transparent, yellow, white, orange, pink, green, blue, etc. Small amounts of titanium dioxide, $T_iO_2$, such as in a weight range of 2–4%, may be added to plastic film 15 to render the film opaque white or with varying degrees of translucency.

Plastic note 10 preferably has static properties such that it easily adheres to a variety of surfaces typically used with notes, memos, post-its, etc. Such surfaces may include, for example, PC screens, windows, refrigerators, mirrors, folders, phones, walls, desks, doors, whiteboards, etc. In a preferred embodiment, following coating, the film is charged to a minimum coefficient of friction (CF) level (as measured by ASTM D 1894, DIN 53375), such as by simply running (preferably the uncoated side of) the film against a resistant surface, which induces static electricity into the coated film. The film is preferably charged below a certain maximum CF level, as further explained below. Charging normally occurs during the actual extrusion process, in which the film passes through several metal contact points. (Normally, anti-static additives, etc., are introduced to the film to minimize the build-up of static electricity, but this step is omitted with the present invention.) Charging can also be accomplished by reducing the level of anti-static agents in the coating, such as by simply not adding or removing these substances from the coating mixture. Post-production (enhancing) charging may also be performed by rubbing the notes briefly against an uncharged surface such as a wall or desktop. Thus, the notes of the present invention may be repeatedly used simply by re-charging them after use, which may be easily accomplished by the consumer.

Suitable plastic films which may be used with the present invention include but are not limited to those made of polypropylene and/or polyethylene, and are comparable to films commonly employed in the food packaging industry. In a particularly preferred embodiment, the plastic film is a polypropylene solid homopolymer film without any additives, such as Moplefan TO film supplied by Moplefan Film of Belgium. This film is particularly suitable since after manufacturing it possesses a high level of static on its surface, enabling it to easily adhere to various surfaces. Moplefan TO is a one-layer film free from additives, which remains static over a long period of time, and which is easier to recharge after, e.g., coating than more complex films (e.g., those with multiple layers and/or additives). For example, a test roll of Moplefan TO 35 film was stored for over a year after production, and after this time it was still suitable for making adherent coated plastic notes.

Moplefan TO is a bioriented heat set polypropylene film which may be used for lamination to other plastic films, or as a single film. Moplefan TO is also particularly useful in the present invention because it is resistant to most solvents and chemical agents, and is generally insensitive to climatic conditions over a wide range of temperatures. Moplefan TO film has the following properties:

| Properties | Unit | Typical Values | Test Method |
|---|---|---|---|
| Tensile strength: | N/mm$^2$ | | ASTM D 882 |
| MD (Machine Direction) | | 130 | DIN 53455 |
| TD (Transverse Direction) | | 270 | |
| Elongation at break: | % | | ASTM D 882 |
| MD | | 160 | DIN 53455 |
| TD | | 50 | |
| Coefficient of friction film/film | — | 0.45 | ASTM D 1894 DIN 53375 |
| WVTR Thickness 25 μ | g/m$^2$.24h | 5.50 | ASTM E 96 38° C. - 90% R.H. |
| Oxygen permeability Thickness 25 μ | cm$^3$/m$^2$.24h.atm | 1500 | ASTM D 1434 25° C. - 0% R.H. |
| Haze Thickness 25 μ | % | 3.2 | ASTM D 1003 |
| Gloss | % | 90 | ASTM D 2457 |
| Treatment Level | dyne/cm | ≧38 | ASTM D 2578 |

While the film thickness may vary depending on the film selected and the particular use, a thickness range "X" (see FIG. 1) of 20–40 microns, and more preferably 30–35 microns, has proven suitable in testing, and appears optimal from a cost standpoint. When choosing a film thickness, manufacturing cost must be weighed against the film's machinability and ease in consumer handling.

If a multilayer film with additives (e.g., OHCT X/W supplied by Moplefan) is used, the film is (preferably) manufactured such that it is not rendered as static as a single-layer film since it has been found that the co-polymers of the other layers or other additives in the film actually reduce the static properties of the film to be coated. This may be true even though the CF level is 0.45 (as measured by ASTM D 1894, DIN 53375 ), which is a CF level which would be acceptable if a single layer film were used. Thus, the CF for OHCT W is 0.45, but it has been found that this film is not static enough for use with an adhesive note, suggesting that CF is not the only deciding factor in determining the suitability of a particular film. Accordingly, film components or features such as the use of three film layers instead of one, and the various additives in the film, may also affect film suitability for the present invention.

If the single layer, additive-free Moplefan TO film is used, a film/film CF of at least about 0.40, and more preferably at least about 0.45, is desirable, where "film/film" connotes the friction coefficient measured by testing the uncoated film against the uncoated film. Tests showed that a plain Moplefan TO 35 (35 micron thickness) film with a CF of 0.45 easily adhered to almost any surface, including outdoor surfaces (e.g., mailbox, door, windows, cars) and in most cases remained adhered for at least 48 hours (and up to months at a time). Of course, optimum adherence times will vary greatly depending on the type of use and the surface adhered to. Desired CF levels and coating weight ranges may, therefore, be varied accordingly.

An upper CF level limit may also exist in many cases. This upper limit may vary, but may be less than about 0.7, and more preferably less than about 0.6. A film which is too static can have a deleterious impact on: (1) machinability during manufacturing, since a film that is too static will attract dust and may become hazardous by producing sparks, due to excessive friction, while running through a manufacturing line; and (2) consumer handling, since consumers desire a product that effortlessly adheres to surfaces, but which does not unduly adhere to fingers or which is difficult to remove. As to (1), a water-based coating might be less hazardous due to a lessened potential for producing sparks and catching fire during manufacturing. It may be important, during manufacturing of the product, to ensure that the coating does not reduce the static properties of the film. Preferably, the coating application upholds or enhances the film's static properties. Therefore, the coating preferably contains no or minimal anti-static agents. The amount of coating, including color pigment, should not be so great such that the coating weight negatively affects the adhesive properties of the film. A low g/m$^2$ should be used, such as an estimated dry weight range of about 2–4 g/m$^2$.

During manufacturing, at the stage of converting the jumbo rolls to the finished product, it may be desirable to assure sufficient charging by increasing the number of contact points in the film, i.e., by introducing a "metal point of contact" while slitting or stacking. This may be done, for example, by making the films reverse-side run across a metal roller, bar or other resistant material which exerts a resistance on the film and which therefore charges it with static electricity A highly static film may also be difficult to cut and press into notepads. Accordingly, care should be taken in the manufacturing process to maintain the static properties of the film in the finished product, with regards to the packaging process. For example, a vertical pressure stacking method may be preferred for this reason, rather than a sliding packaging method where further charging of the film may make stacking and/or packaging difficult.

Another preferable packaging method which may be used is to run the coated film through a kind of ticketing/perforating machinery, producing fine perforations 22 which allow a continuous stream of notes to be easily stacked by folding in a "z" shape, as shown in FIG. 1. Alternatively, the notes may be packaged for sale in a "Z" perforated rolls. An additional advantage of coating 20 is that it provides sufficient traction to facilitate feeding the notes through machinery.

Coating 20 is preferably manufactured separately and added to the film as the plastic note is manufactured. Coating 20 as well as advertising print (flexo ink) may be applied to the plastic film using a typical flexo unit as will be understood by those of ordinary skill in the art. Alternatively, any other suitable method may be used to apply the coating, consistent with the goal of achieving similar results (to those obtained by using a flexo unit) in terms of coating evenness, consistency and quantity/surface area.

Rollers may be used to apply coating 20. Less advertising ink volume is needed for plastic as compared to paper due to the lower absorbency rate of plastic film. Therefore, the rollers used should be made for printing on plastic, and should lay down the required amount of coating and/or color inks per square meter. An estimated coating range, in dry weight on the film (on the finished plastic note), is 2–4 grams/meter$^2$. Of course, the coating amount may vary given the application. Also, a sufficient drying apparatus should be employed, such as an ultraviolet or hot air apparatus.

Depending on the type of use intended for the adherent notes, e.g., indoor/oudoor, "advanced" adherent note versions with coating 20 compositions modified to absorb the writing from instruments with a high wet ink content may need to be developed. Also, while certain coatings may have the same general characteristics, they may differ in chemical composition in that some are water-based while others are alcohol or solvent based, and the selection of one or the other may be desirable depending upon the application (e.g., it may be more desirable to use water-based coatings to meet environmental standards or for environmental applications).

Ink drying tests were conducted using a rollerpoint/ballpoint pen by Rotring (Rollerpoint EF), with respect to time and quality. The samples tested were: (1) coated adherent plastic notes with ink handwriting, using a solvent-based coated Moplefan TO 35 film; (2) uncoated TO 35 static plastic notes with handwriting; and (3) standard paper "post-it" notes (Type 655, from 3M). A wet thumb and a dry thumb were used for smearing, as noted. The results were as follows:

After 5 seconds (wet thumb):

(1)—good result; after smearing, text is still fairly clear and readable (2)—major smearing; useless (3)—fairly good result; after smearing, text is readable, but not as clear as with sample (1)

After 15 seconds (wet thumb):

(1)—very good result; text clear and readable after attempted smearing (2)—N/A (3)—good result; text readable after smearing, but slightly disrupted by smearing After 60 seconds, plus (wet thumb):

very good result; very clear text, and almost no disruption after attempted smearing (2)—N/A (3)—good result; quite clear text after attempted smearing, but still slightly disrupted by smearing After 60 seconds, plus (dry thumb)

(1)—excellent results; perfect text after attempted smearing, with no disruption of text (2)—N/A (3)—Excellent results - perfect text after attempted smearing, with no disruption of text It is also noted that with samples (1) and (3 ), the ink dried within about 5 seconds such that it was absorbed on the plastic film or paper surface and did not easily smear when touched. With sample (3), however, after about 5 seconds the ink could be smeared completely off the surface of the plain uncoated OT 35 film.

In a separate test, sample adherent plastic notes using a solvent-based, coated Moplefan TO 35 film and conventional paper post-it notes (Type 655, from 3M) were left outside in various weather conditions. After a week, the notes were attempted to be adhered to various surfaces such as walls, doors, windows, a PC screen, etc. The adherent plastic notes successfully adhered to the various surfaces after a week, whereas the paper notes did not.

In another series of tests, static plastic notes using the solvent-based, coated Moplefan TO 35 film and paper post-it notes (Type 655, 3M) were simultaneously adhered to the same painted, conventional interior office wall. The paper notes lost adherence and released from the wall after a few hours, whereas the plastic notes remained adhered to the wall for at least a few days and up to three weeks before the test was ended. The tests were obviously not exhaustive and results may vary depending upon the surface to be adhered to. However, the tests did demonstrate superior adherence and durability aspects for the plastic note of the present invention over the conventional "post-it" paper note.

In one embodiment, a transparent version of the plastic note of the present invention may be used to adhere to, e.g., PC screens, transparencies used with overhead projectors, text books, drawings or other surfaces, so that a display beneath the note can be read simultaneously with the contents of the note. The transparent version of the notes of the present invention need not be coated, as (e.g.), they adhered to a classroom/office white wallboard and permanent markers could still be applied to them. But for other applications, described below, such as transparent notes for placing over PC screens, the notes will generally need to be suitably coated for optimum use.

The notes are preferably manufactured in a manner which renders them insensitive to climatic conditions and usable over a wide range of temperatures. The notes may be manufactured in handy sizes such as sizes equivalent to conventional paper notes (e.g., typical dimensions of 76 mm by 127 mm). Of course, however, notes of the present invention may be provided in a variety of sizes and shapes ranging from square or rectangular notes to customized shapes in the form of animals or other objects. The notes may be simply stacked and packaged, or they may be bound using any suitable method.

In an alternative embodiment, the adherence-causing mechanism of the plastic notes of the present invention may be conventional adhesive glue as used with post-its, for example, or other adherence-causing substances, rather than static charging. With this embodiment, the durability, weather-resistant and transparent/coloring features of the plastic note will still be retained.

In another aspect of the present invention, a note holder and/or dispenser may be used. This notepad holder, which might consist of a flat pad with metal and rubber sections, for example, can neatly hold the notepad in an appealing desktop ornament. The notepad holder can also be employed to self-charge the individual notes as they are dispensed.

Figure 2:
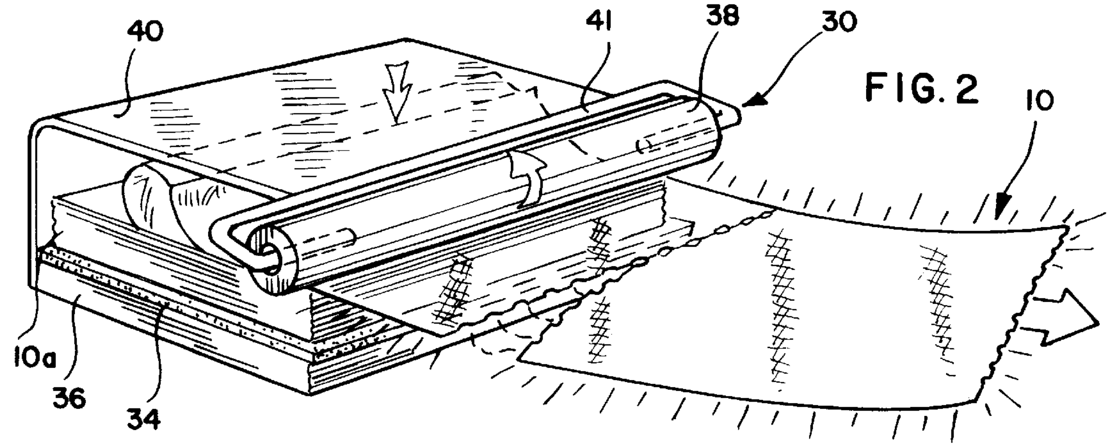
FIG. 2 is a perspective view of one embodiment of a holder and dispenser for the plastic notes of the present invention.
Figure 3:
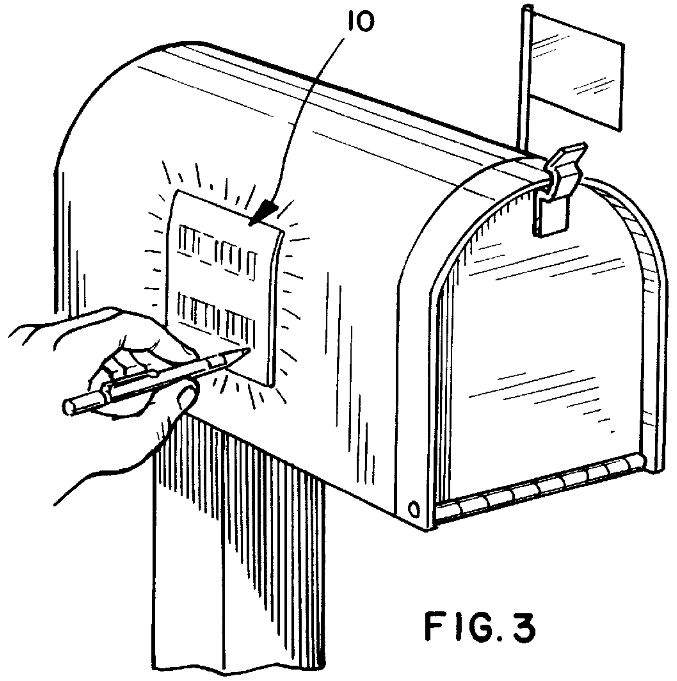
FIGS. 3 and 4 are perspective views showing exemplary outdoor and indoor uses, respectively, of the adherent plastic note of the present invention.
Figure 4:
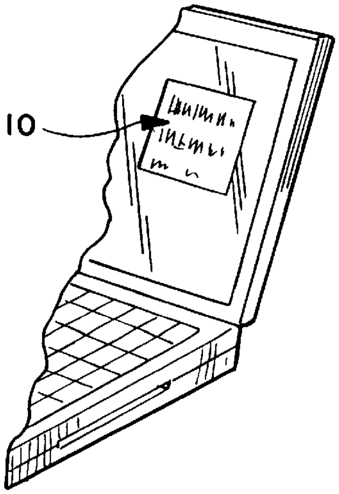

An example of such a notepad holder is shown in FIG. 2. Here, notepad holder 30 is a two-layer flat desktop object. Holder 30 is large enough so that plastic notepad 10*a* may be placed on rubber layer 34, which may be located above metal layer 36. Rubber layer 34 may be used to re-charge reused notes, or to "supercharge" notes intended for adherence to surfaces which prove difficult to adhere to. A metal (e.g., steel) weight 38, which may be in fixed or roller form, may be attached to holder 30 through rod 41 and L-shaped sheet 40, under which notepad 10*a* may be held in place. Metal weight 38 may be placed in tension on the notepad using a spring mechanism such as L-shaped metal sheet 40, which exerts downward pressure on notepad 10*a* through roller weight 38. Pulling off a note under weight 38 creates friction and provides static electricity to the note. Of course, various other embodiments may be envisioned, such as a "tape dispenser"-type device in which charging, sizing and cutting of the plastic note is provided at one time.

Plastic notes 10 of the present invention are also environmentally friendly. If a water-based coating is used, when combusted about 90 % of the note's mass transforms into carbon dioxide and water vapor, while the remainder is a chemically insert, harmless residue. If a solvent-based coating employing a nitrocellulose bonding system is used, however, the nitrocellulose will emit nitrous gases.

The adherent plastic notes of the present invention have several advantages over conventional paper notes. They are weather resistant and durable, such that they can be left outside in various kinds of weather, including rain, without impairing the quality of the notes themselves, the printed/written indicia on them, or their adhesive qualities. Conventional paper notes do not possess these durability attributes. The plastic notes described here can also be manufactured more economically than adhesive paper notes, and can be more easily differentiated from a marketing standpoint. Plastic notes are also thinner than paper notes.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

I claim:

1. An adherent plastic note capable of accepting printed indicia, comprising:

at least one layer of a plastic film treated on at least one side of the plastic film so as to tension a surface of the film;

an absorbent coating applied to the at least one treated side of the at least one layer of the plastic film, the absorbent coating being capable of receiving printed indicia;

wherein the plastic note is provided with an adherence mechanism that renders the note capable of being adhered to various surfaces, the adherence mechanism comprising a static electric charge applied to the plastic note.

2. The adherent plastic note of claim 1, wherein a minimum coefficient of friction level of the plastic note is between about 0.4 and 0.7.

3. The adherent plastic note of claim 1, wherein the adherence mechanism also comprises an adhesive glue applied to the side of the note opposite the side to which the printed indicia is applied.

4. The adherent plastic note of claim 1, wherein the plastic film comprises polyproyplene.

5. The adherent plastic note of claim 1, wherein the plastic film comprises polyethylene.

6. The adherent plastic note of claim 1, wherein the plastic film is transparent.

7. The adherent plastic note of claim 6, wherein the coating comprises a color pigment.

8. The adherent plastic note of claim 1, wherein the plastic film comprises a color pigment.

9. The adherent plastic note of claim 1, wherein the coating is applied to the treated side of the at least one layer of the plastic film within a range of about 2–4 $g/m^2$.

10. The adherent plastic note of claim 1, wherein the at least one side of the at least one layer of the plastic film is treated to a treatment level about equal to or greater than 38 dyne/cm.

11. The adherent plastic note of claim 1, wherein the coating is a water-based coating.

12. An adherent plastic note capable of accepting printed indicia, comprising:

at least one layer of a plastic film treated on at least one side of the plastic film so as to tension a surface of the film;

an absorbent coating applied to the at least one treated side of the at least one layer of the plastic film, wherein the coating is a solvent-based coating and is capable of receiving printed indicia;

wherein the plastic note is provided with an adherence mechanism that renders the note capable of being adhered to various surfaces.

13. An adherent plastic note capable of accepting printed indicia, comprising:

at least one layer of a plastic film treated on at least one side of the plastic film so as to tension a surface of the film;

an absorbent coating applied to the at least one treated side of the at least one layer of the plastic film, wherein the coating has a friction coefficient as measured by the Davenport method of about 0.60–0.64 and is capable of receiving printed indicia;

wherein the plastic note is provided with an adherence mechanism that renders the note capable of being adhered to various surfaces.

14. The adherent plastic note of claim 1, wherein the coating enables the application of relatively smear-proof printed indicia.

* * * * *